United States Patent [19]

Morcos et al.

[11] 4,041,317

[45] Aug. 9, 1977

[54] MULTIPLE PH ALUMINA COLUMNS FOR MOLYBDENUM-99/TECHNETIUM-99M GENERATORS

[75] Inventors: Nabil A. Morcos, Kendall Park; Gerald A. Bruno, Shrewsbury; Thomas A. Haney, East Brunswick, all of N.J.

[73] Assignee: E. R. Squibb & Sons, Inc., Princeton, N.J.

[21] Appl. No.: 687,713

[22] Filed: May 19, 1976

[51] Int. Cl.² .......................................... G01M 21/24
[52] U.S. Cl. .............................. 250/432 PD; 250/303; 250/328
[58] Field of Search .................................. 250/432 PD

[56] References Cited

U.S. PATENT DOCUMENTS

| | | | |
|---|---|---|---|
| 3,740,558 | 6/1973 | Kato et al. | 250/432 PD |
| 3,785,990 | 1/1974 | Benjamins et al. | 250/432 PD |

*Primary Examiner*—Harold A. Dixon
*Attorney, Agent, or Firm*—Lawrence S. Levinson; Merle J. Smith; Donald J. Barrack

[57] ABSTRACT

Molybdenum-99/technetium-99m generators utilizing a multiple pH alumina support medium are disclosed herein. The elution of these generators result in a minimum of low yield problems.

10 Claims, 2 Drawing Figures

MULTIPLE PH ALUMINA COLUMNS FOR MOLYBDENUM-99/TECHNETIUM-99M GENERATORS

BACKGROUND OF THE INVENTION

Technetium-99m has become widely used in the field of nuclear medicine for the scanning and visualizing of various organs and tissues in the body. When coupled with various substances it has been used, for example, for visualization of the brain, lungs, blood pool, thyroid, liver, spleen, bone and kidney. One of the reasons for the wide-spread acceptance of technetium-99m in the field of nuclear medicine is its relatively short half-life of about 6 hours. While the short half-life of technetium-99m is advantageous in minimizing the physiological risks associated with the use of radioisotopes, it also makes it highly desirable to generate the short-lived radionuclide as close to its time of use as possible.

The patent literature provides many examples of apparatus and methods which can be used for the generation of technetium-99m (referred to in the generator art as the "daughter radionuclide") from molybdenum-99 (referred to in the generator art as the "parent radionuclide"); see, for example, U.S. Pat. Nos. 3,369,121 and 3,920,995. The generators currently in use for the generation of technetium-99m from molybdenum-99 comprise a containerized support medium, e.g., chromatographic grade alumina, having adsorbed thereon molybdenum-99. The container is part of a sterile system which further comprises inlet means for introducing an eluant onto the support medium having the molybdenum-99 adsorbed thereon, and outlet means for removing the eluate containing the technetium-99m from the support medium. The operation of this type of generator, as explained by Boyd, "Recent Developments in Generators of $^{99m}$Tc", Proceedings of a Symposium on Radiopharmaceuticals and Labelled Compounds, Copenhagen, Mar. 26–30, 1973, International Atomic Energy Agency, Vienna (1973), is based on the differences in the distribution-coefficient values of the carrier material for the ions of molybdenum-99 and technetium-99m. The passage of the proper eluant through the support medium will result in the elution of technetium-99m. If physiological saline is utilized as the eluant, the technetium-99m will be eluted in the form of sodium pertechnetate. The pertechnetate ion has as valence of +7, and is technetium's highest and most stable oxidation state in solution.

Commercial generators of the above-described type, having alumina as the support medium, are delivered to customers for periodic elution. The amount (in millicuries) of technetium-99m obtained in the initial elution will depend on the original potency of the generator. The activity obtained in subsequent elutions will depend on the time interval between elutions. A problem often encountered with the generators is low yield (incomplete removal) of technetium-99m. These yield problems occur most frequently during the early elutions of high activity generators, and are usually the result of a delayed release of technetium-99m from the alumina. It is possible for the generator user to compensate for the low yield by an additional elution of the generator, but such an additional elution is highly undesirable because of the additional risk of exposure to radiation and because of the inconvenience involved.

Low yield problems have been discussed in the literature (see Boyd, supra. and Vesely et al. "Some Chemical and Analytical Problems Connected with Tc-99m Generators," Radiopharmaceuticals from Generator-Produced Radionuclides (Proc. Panel Vienna, 1970) International Atomic Energy Agency, Vienna (1970)) and have been attributed to the effect of ionizing radiation on the valance state of technetium-99m. The reductive nature of the combination of high radiation levels and water may cause technetium to go from its highest valence state of +7 to lower oxidation states, making the technetium difficult, if not impossible, to remove from the generator system with isotonic saline solution.

The prior art has dealt with the problem of low yields by using on oxidizing agent in the saline eluant or on the alumina column (see, for example, U.S. Pat. No. 3,664,964). The major disadvantage of this technique is that the technetium eluate from the generator is frequently used, as described above, to label substances for localization (and subsequent imaging and visualization) in various organs and tissues. The materials are often in the form of commercial kits which contain, in addition to the substance to be labelled, a reducing agent to facilitate labelling. The presence of an oxidizing agent in the eluate can be detrimental to this process.

SUMMARY OF THE INVENTION

It is an object of this invention to reduce, or eliminate, low yield problems in molybdenum-99/technetium-99m generators.

It is an object of this invention to reduce, or eliminate, low yield problems in molybdenum-99/technetium-99m generators without the aid of an oxidizing agent.

These, and other objects, that will be apparent to the person skilled in the field of nuclear medicine, are achieved by the apparatus and process of this invention.

It has now been found that more uniform yields of technetium-99m can be obtained from a molybdenum-99/technetium-99m generator if the generator's alumina support medium is made up of at least two alumina beds, the first of the beds having a relatively high pH and the second of the beds having a relatively low pH.

DETAILED DESCRIPTION OF THE INVENTION

Low yield problems in molybdenum-99/technetium-99m generators are minimized by diffusion of molybdenum-99 on the alumina support medium. The net effect of the diffuse distribution of molybdenum-99 is to spread the radioactivity over a larger volume, and decrease the radiation dose to a unit volume within the generator column. A uniform and effective approach to diffusion of the molybdenum-99 on the alumina support medium has been found based on the relationship between alumina pH and the affinity of molybdenum-99 for the alumina.

Maximum adsorption of molybdenum-99 (in aqueous solution) occurs at a pH of about 2.0 to 6.0. The coefficient of diffusion drops by four orders of magnitude (i.e., $10^4$) at pH 8 and by a factor of 2 at pH 12.

Effective diffusion of molybdenum-99 on the alumina support medium in a molybdenum-99/technetium-99m generator is realized by utilizing a multiple pH alumina support medium. The alumina support medium utilized in the generators of this invention comprises a first bed having alumina of pH above about 6.0, and a second bed having alumina of pH below about 6.0, with the proviso that the pH of the two alumina beds differs by at least about 0.5. Preferably, the pH of the alumina in the first bed will be from about 7.0 to about 10.0 and the pH of the alumina in the second bed will be about 3.5 to about 5.5 and most preferably about 4.1.

Figure 2:
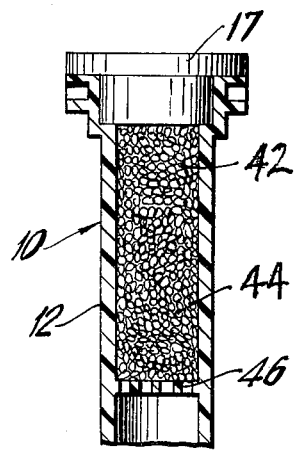
FIG. 2 is a side elevational view of a column shown in cross-section to illustrate the multiple pH alumina support medium.

As described above, the molybdenum-99/technetium-99m generators encompassed by this invention comprise an alumina support medium of multiple beds of controlled pH, as shown in FIG. 2 having at least two alumina beds (42,44). The expression "first bed" refers to the alumina which first receives the molybdenum-99 during column loading, and the expression "second bed" refers to the alumina which receives the molybdenum-99 after it has passed through the first bed. Since the first alumina bed has a pH of above about 6.0, the molybdenum-99 loaded onto the column will diffuse through the bed and reach the second bed. The second bed is needed to prevent the leakage of molybdenum-99 (known in the art as "moly leakage") from the column.

The alumina support medium contemplated for use in the generators of this invention can have additional beds of alumina between the first and second beds or after the second bed. The critical limitation is that the pH of the various alumina beds does not increase (i.e., the alumina does not become more basic) from the first bed sequentially through the subsequent beds. Contemplated for use in the generators of this invention is an alumina support medium made up of alumina having a decreasing pH gradient from the alumina first contacted with molybdenum-99 to the alumina furthest from the first contacted alumina.

As can be seen from the above description, the design of a multiple pH alumina support medium for use in a generator of this invention necessitates the optimization of the alumina bed heights. The first bed should be of sufficient height to allow for diffusion of the molybdenum-99 to a degree that will result in substantially no low yield problems. The second bed should be of sufficient height to prevent any significant molybdenum-99 leakage. Optimum bed heights will of course vary with the pH of the aluminas utilized. It is preferred, however, that the first bed contain about 15 to 25 weight percent of the total alumina and the second bed contain about 75 to 85 weight percent of the total alumina in a two bed column.

Figure 1:
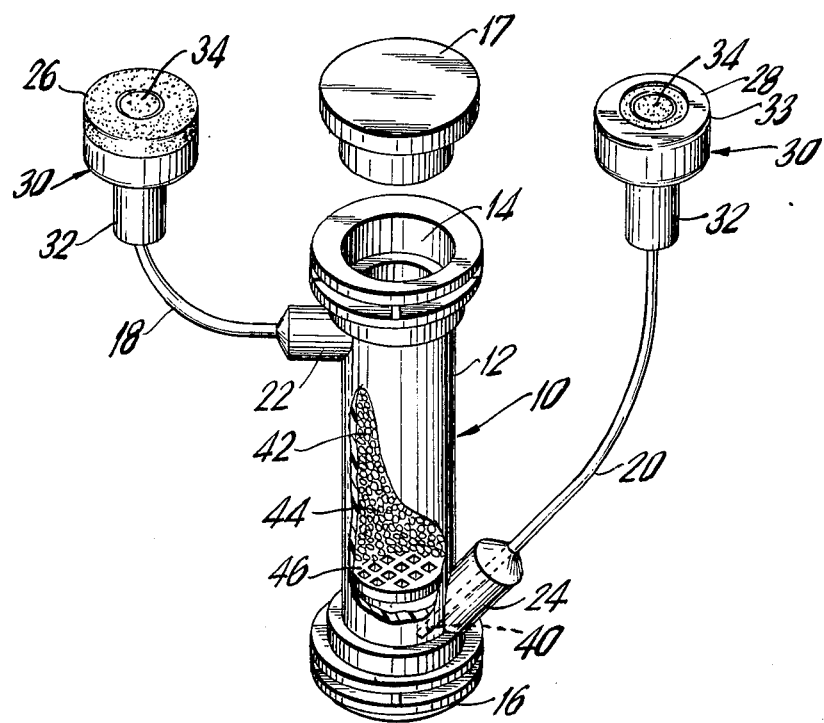
FIG. 1 is a perspective view of a generator partially cut away to reveal the connection therewith of the outlet conduit.

In addition to the multiple pH alumina column described above, the molybdenum-99/technetium-99m generator system of this invention will further comprise inlet means for introducing an eluant onto the multiple pH alumina column having adsorbed thereon molybdenum-99 and outlet means for withdrawing the eluate containing technetium-99m from the column. FIG. 1 illustrates a specific embodiment of a generator of this invention. A more complete description of the generator can be found in U.S. Pat. No. 3,920,995. The generator 10 is sealed at its top 14 and bottom 16 by stoppers 17 which are adapted to be pierced by hypodermic needles for the purpose of loading the molybdenum-99 onto the alumina beds 42,44, which rest on a disc 46. Eluant may be added to the generator 10 via conduit 18 and eluate removed via conduit 20. The conduits are shown as separate tubes encapsulated within projections 22,24 which are unitary with the housing 12. Conduits 18, 20 may, of course, be unitary with the housing 12, the entire unit being formed of a molded plastic. Covers 26,28 which seal the conduits 18,20 comprise molded cups 30 having a stem 32, which stem encapsulates the upper terminus of the conduits 18,20. The open ends of the conduits 18,20, however, are not blocked by cup 30, but are open to the chamber. A pierceable closure 34 is sealingly received in the cup 30, and is held in place by means of a flexible metallic ring 33 which is crimped about the cup 30 and the closure 34.

Eluant is introduced into the generator 10 by being passed through the closure 34 into the cup 30, and from there into inlet conduit 18. By providing a reduced pressure in cover 28, the eluant is pulled through the generator 10, passing through the alumina beds 42,44 where it picks up the technetium-99m, carrying it into the lower terminus 40 of the outlet conduit 20. Preferably, an evacuated container is used to provide the reduced pressure in cover 28, and draw the fluid out of cup 30 in cover 28.

Many procedures for loading a generator of the type described above with the alumina support medium will be apparent to the practitioner of this invention. It has been found, however, that particularly satisfactory results are achieved when the column is first filled with alumina for the second bed, alumina from the second bed is removed from the top of the column to the desired depth of the first bed and alumina for the first bed is then added to the column.

What is claimed is:

1. Apparatus for the generation of technetium-99m from molybdenum-99 comprising an alumina support medium for adsorption of the molybdenum-99, means for containing said alumina support medium, inlet means for receiving eluant, and outlet means for removing eluate, wherein said alumina support medium comprises at least two beds of alumina, a first bed having a pH above about 6.0 and a second bed having a pH below about 6.0, the difference in the pH of the two beds being at least 0.5.

2. Apparatus in accordance with claim 1 having two beds of alumina.

3. Apparatus in accordance with claim 1 wherein the first alumina bed has a pH of about 7.0 to 10.0.

4. Apparatus in accordance with claim 1 wherein the second alumina bed has a pH of about 3.5 to 5.5.

5. Apparatus in accordance with claim 1 wherein the first alumina bed has a pH of about 7.0 to 10.0 and the second alumina bed has a pH of about 3.5 to 5.5.

6. In a process for generating technetium-99m from molybdenum-99 which comprises passing an eluant through an alumina support medium having molybdenum-99 adsorbed thereon and collecting the eluate containing technetium-99m, the improvement comprising: employing an alumina support medium comprising at least two beds of alumina, a first bed having a pH above about 6.0, and a second bed having a pH below about 6.0, the difference in the pH of the two beds being at least 0.5.

7. A process in accordance with claim 6 wherein the alumina support medium has two beds of alumina.

8. A process in accordance with claim 6 wherein the first alumina bed has a pH of about 7.0 to 10.0.

9. A process in accordance with claim 6 wherein the second alumina bed has a pH of about 3.5 to 5.5.

10. A process in accordance with claim 6 wherein the first alumina bed has a pH of about 7.0 to 10.0 and the second alumina bed has a pH of about 3.5 to 5.5.